United States Patent
Liu et al.

(10) Patent No.: US 7,062,282 B2
(45) Date of Patent: Jun. 13, 2006

(54) METHOD AND APPARATUS FOR FREQUENCY SYNCHRONIZATION IN A DIGITAL TRANSMISSION SYSTEM

(75) Inventors: Shang-Chieh Liu, Jubel (TW); Wei-nan Sun, Kaohsiung (TW); Ho-chi Hwang, Hsin-Chu (TW)

(73) Assignee: Mediatek, Inc., Hsin-Chu (TW)

( * ) Notice: Subject to any disclaimer, the term of this patent is extended or adjusted under 35 U.S.C. 154(b) by 462 days.

(21) Appl. No.: 10/199,203

(22) Filed: Jul. 19, 2002

(65) Prior Publication Data
US 2004/0014480 A1 Jan. 22, 2004

(51) Int. Cl.
*H04B 7/005* (2006.01)
*H04J 1/00* (2006.01)

(52) U.S. Cl. ............. 455/502; 455/226.1; 455/226.2; 370/208; 370/206; 707/204

(58) Field of Classification Search .......... 455/226.1, 455/226.2, 502; 370/208, 206, 362, 503; 707/204
See application file for complete search history.

(56) References Cited

U.S. PATENT DOCUMENTS

| | | | |
|---|---|---|---|
| 5,241,688 A | 8/1993 | Arora | |
| 6,226,336 B1 | 5/2001 | Atarius et al. | |
| 6,356,608 B1 | 3/2002 | Atarius | |
| 6,480,555 B1 | 11/2002 | Renard et al. | |
| 6,693,882 B1 | 2/2004 | Gu et al. | |
| 6,807,147 B1 * | 10/2004 | Heinonen et al. | 370/208 |
| 2002/0094048 A1 * | 7/2002 | Simmons et al. | 375/362 |
| 2002/0126618 A1 * | 9/2002 | Kim | 370/208 |
| 2004/0199554 A1 * | 10/2004 | Aslanis et al. | 707/204 |

OTHER PUBLICATIONS

GSM Specification 05.02 version 8.3.0, 1999.

* cited by examiner

*Primary Examiner*—Nick Corsaro
*Assistant Examiner*—Alan T Gantt
(74) *Attorney, Agent, or Firm*—Hogan & Hartson, L.L.P.

(57) ABSTRACT

Frequency synchronization bursts are detected for a radio communication system such as a GSM cellular telephone network using a two stage correlation process. A first unit performs a first set of correlations to identify receipt of the frequency synchronization burst. A preliminary identification is declared when the moving average of the first set of correlations, normalized for received power, exceeds a threshold value for a number of contiguous samples. After a preliminary identification is made, a second unit performs a second set of correlations to confirm the detection of the frequency synchronization burst. The second correlations are preferably also normalized and confirmation of detection is declared when the normalized moving average of the second stage correlation exceeds a threshold value for a number of contiguous samples.

32 Claims, 6 Drawing Sheets

METHOD AND APPARATUS FOR FREQUENCY SYNCHRONIZATION IN A DIGITAL TRANSMISSION SYSTEM

BACKGROUND OF THE INVENTION

1. Field of the Invention

This invention generally relates to pilot tone acquisition and timing offset estimation in a wireless communication system such as that used for cellular telephony. It provides a method and apparatus for detecting a synchronization signal from the radio propagation channels with sufficiently high probability as well as an acceptably low false alarm rate even in the presence of a large frequency deviation at the receiving side. In addition, aspects of the present invention locate the timing boundary of the incoming data stream in a digital transmission system by detecting the pilot tone.

2. Description of the Related Art

In a mobile communication system having a pilot channel, a mobile station (MS) synchronizes with the base station (BS) via a pilot channel so that information can be exchanged and a communication link can be established successfully. Since the mobile station generally does not have a sufficiently accurate timing and frequency reference, the mobile station detects the synchronization signal in the pilot channel and extracts from the pilot signal a frequency offset for tuning the mobile station's internal frequency reference and tuning the timing offset for frame synchronization. More particularly, in a time division multiple access (TDMA) system like the European Global System for Mobile Communication (GSM), a logical channel called the frequency correction channel (FCCH) is transmitted on the broadcast control channel (BCCH) carrier and interleaved in time within the structure of the fifty-one frame multiframe to facilitate coarse frequency and timing synchronization. When the mobile station is powered on or when the mobile station is handed off from one cell base station to another, the mobile station has to capture the FCCH from the interested base station to communicate with that base station.

The FCCH provides mobile stations with the ability to initially synchronize with a system employing the GSM standard. An appropriate physical manifestation of the logical FCCH is generated by providing a constant input sequence into a Gaussian minimum shift keying (GMSK) modulator in a repeated manner, as is described in detail in GSM Specification 05.02, version 8.3.0 (1999). The physical manifestation of the FCCH in a GSM system includes the frequency correction burst (FCB). The modulated FCCH waveform is a pure tone of about 66.7 kHz. By detecting the existence and timing of this pure tone, the mobile station can identify the frame boundary and then synchronize its local oscillator with respect to the interested base station. After detecting the FCCH, the mobile station uses the information obtained from detecting the FCCH to decode the synchronization burst (SB) located eight bursts after the FCCH and finally the mobile station can lock onto (i.e., camp on) the interested base station using the system information on the broadcast control channel.

Since the duration of the FCCH is relatively short, FCCH detection needs to occur in real time even for bad channel conditions such as severe noise perturbations and large frequency deviations. U.S. Pat. No. 6,356,608 proposes a method for detecting and synchronizing with the FCCH in a receiver's back-end circuitry. That patent's strategy relies on pre-processing to provide signal de-rotation via table lookup and uses a large memory to perform the de-rotation, which can be undesirable if it impacts on the speed with which the synchronization tone is acquired. The apparatus in U.S. Pat. No. 5,241,688 adaptively filters received signals to acquire the timing and frequency offset compensation. Some potential problems have to be taken into account in using an adaptive filtering strategy. The transient processing of the training phase of the adaptive filtering may introduce a delay that could affect the FCCH detection algorithm. Furthermore the filter parameters may go out of bounds after several TDMA frames of unsuccessful detection so that the FCCH might not be detected.

SUMMARY OF THE PREFERRED EMBODIMENTS

An aspect of the present invention provides a method of detecting a frequency synchronization signal for a digital transmission network in which a sender transmits a plurality of signals including a frequency correction tone so that a receiver can synchronize with the sender. The method includes correlating received samples of a plurality of signals (which can be referred to as signal symbols) including a frequency correction tone and averaging the correlated symbols using a moving average over a sliding window to generate at least a portion of a revenue function. An average power of the received signals is calculated for normalizing the revenue function. The method determines whether the frequency correction tone is present by comparing the revenue function with a threshold and observing that the revenue function exceeds the threshold for a number of contiguous symbols. After the frequency correction toned is detected, the method estimates a timing offset by searching for a peak position of the revenue function.

Another aspect of the invention provides a method of synchronizing a receiver in a digital transmission network, in which a front end receives signals from a radio communication channel and provides a sequence of received signal symbols. A first stage, preliminary detection process preliminarily detects a frequency correction signal and processes received signal symbols to generate a preliminary detection signal when the received signal symbols are judged to correspond to the frequency correction signal. A second stage, confirming detection process confirms detection of the frequency correction signal and is responsive to the received signal symbols, the preliminary detection signal and an average power measure and generates a confirming detection signal when a second revenue function is greater than a threshold value for a plurality of consecutive sample times.

DETAILED DESCRIPTION OF THE PREFERRED EMBODIMENTS

Figure 1:
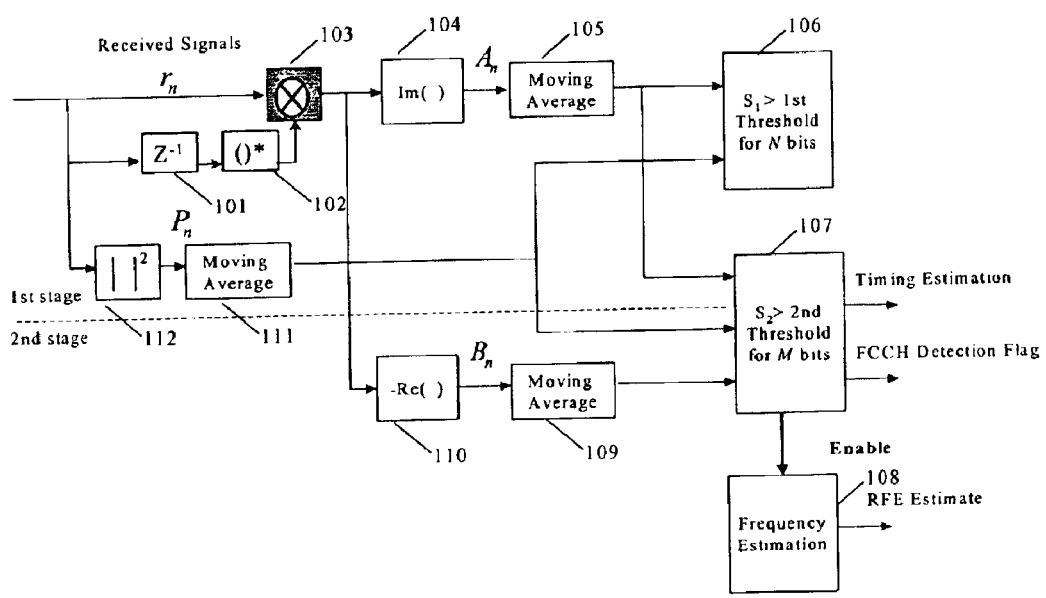
FIG. 1 shows a functional block diagram of a synchronization process in accordance with a first synchronization strategy.

A synchronization process according to one aspect of the present invention proceeds by comparing a revenue function generated from a set of contiguous symbols with a predefined threshold. When the revenue function is above the threshold value for a sufficient number of contiguous symbols, a preliminary identification of the synchronization tone is recognized. Further processing may be used to refine the synchronization or establish a frame position. This process helps to synchronize a mobile station's local oscillator frequency and its frame boundary with the frequency and boundary of the incoming signal from a base station. An advantage of the present strategy is that it can detect a synchronization tone for large frequency deviations with sufficiently high probability and is suitable for real-time applications with significantly enhanced accuracy. The synchronization process might use a two revenue function, two stage approach or the synchronization process might be implemented with only a single stage.

Aspects of the present invention provide a synchronization method and apparatus for communication systems having a pilot channel. The method and apparatus can detect a synchronization tone signal from the radio propagation channels with sufficiently high probability, preferably by using a multi-stage approach. Using multiple stages can provide an efficient processing strategy that allows for detection of a synchronization tone in real time using an acceptable level of processing. In a particularly preferred embodiment, two processing stages are used to perform coarse and fine synchronization. Taking as an example this preferred two stage process, illustrated in FIG. 1, a preferred synchronization method may use a storage unit to accumulate signal symbols generated by an analog to digital or A/D converter. A first revenue function calculation unit (first stage) is used to make the preliminary decision as to synchronization tone detection from a frequency correction channel (FCCH). A second revenue function calculation unit (second stage) is used to make the final decision of tone detection from the FCCH. The preferred detection scheme makes the decision whether the FCCH exists and where it is, and is capable of doing so even in the presence of large frequency deviations. Moreover, preferred embodiments also locate the timing boundary of the incoming data stream in a digital transmission system by detecting the occurrence of the synchronization tone.

The first revenue function calculation unit preferably computes a first revenue function by performing a sliding summation over successive windows within a long interval. As long as the first revenue function exceeds the first predefined threshold for N contiguous symbols of the sliding summation process, the first revenue function calculation unit signals the preliminary decision that the FCCH exists with sufficient confidence. After the preliminary detection of the FCCH by the first revenue function calculation unit, the second revenue function calculation uses a second revenue function that is preferably independent of phase offset due to the propagation channel and the impairment of the local oscillator. This strategy relies on the second revenue function to reduce the false alarm probability and to avoid the degradation of detection performance caused by large frequency deviations. The second revenue function calculation unit determines whether the value of the second revenue function exceeds a second predefined threshold for M contiguous symbols.

In one embodiment, the revenue function for the first stage is defined as the correlation of the complex-valued received signal symbols with delayed versions of those signal symbols. For the second stage, the revenue function may be selected as the self-correlation of a sequence that is identified by the first correlation unit within a sliding window. Note that the revenue function discussed here is sometimes also referred to as a cost function. From the perspective of this discussion, these terms are interchangeable.

In another embodiment, the first stage revenue function can be obtained by computing the cross product of the complex-valued received symbols for every two symbols. The constellation of the typically transmitted signals (FIG. 2) allows for reduced complexity in the calculations. The second stage of the complex correlation of received symbols is averaged over a sliding window.

After a synchronization tone is found, the associated timing offset can be estimated by the peak position of the revenue function to provide frame synchronization and the residual frequency error can be obtained to compensate for the frequency mismatch of the local oscillator.

In the GSM system, the frequency correction burst (FCB) corresponding to the logical frequency correction channel (FCCH) is a sequence of 148 symbols, with each of the symbols a zero. The FCCH is transmitted intermittently but regularly to allow for synchronization of the base station to the time slots allotted by the base station. As transmitted, the FCCH appears as the purely sinusoidal carrier signal with a frequency of approximately 67.7 KHz. The FCB is followed by a synchronization burst (SB), which provides timing reference information. Synchronizing a mobile station with an interested base station proceeds by the mobile station acquiring the FCCH and using the information derived from the FCCH to obtain the SB, which is processed to obtain additional synchronization information. Acquiring the FCCH signal proceeds by tone detection in the mobile station.

In preferred implementations of the present invention, all revenue functions are confined within a known range through the use of readily implemented normalization techniques. Two different revenue functions are described for each of the synchronization stages so that, as a practical matter, the embodiments correspond to two architectures for implementing the present strategies. Variations of these overall strategies will be apparent to those of ordinary skill in the art.

The complex received signal for a Gaussian minimum shift keying (GMSK) modulated tone sampled at time n can be modeled as $$r_n = s_n + w_n = \sqrt{P_n} \exp\left(j\left(\frac{n\pi}{2} + n\theta + \varphi\right)\right) + w_n.$$

Figure 2:
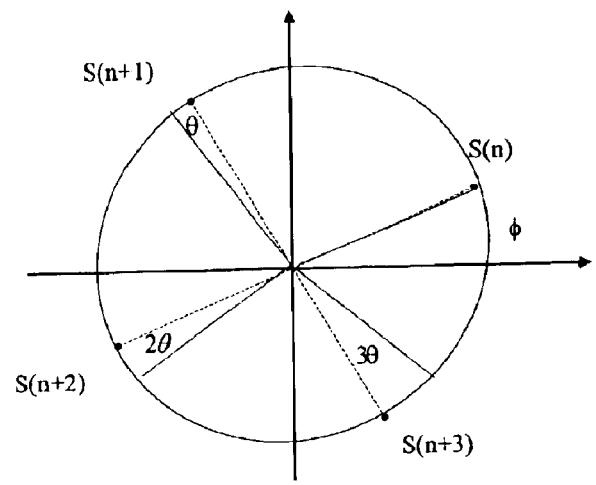
FIG. 2 shows the signal constellation of a Gaussian minimum shift keying (GMSK) modulated tone.

Here $P_n$ is the transmitted power, $\theta$ represents the inaccuracy of the mobile station's local oscillator as compared to the clock within the transmitted signal, $\phi$ is caused by noise in the wireless channels, and $W_n$ is a perturbation term. GMSK signals are typically used for communication in GSM communication systems. Quadrature detection techniques are generally used in detecting the communication signals so that the real (in phase, I) and imaginary (out of phase, Q) samples are generated in the detection process. The general GMSK signal constellation $S_n$ is shown in FIG. 2.

The basic operation used for tone detection is the moving-average correlation of two neighboring received symbols. Preferred implementations of aspects of the invention use a two stage self-correlation approach. Such a two-stage self-correlation approach is illustrated in FIG. 1, with the division between the first and second stage calculations indicated by a dashed line. As shown in FIG. 1, the first self-correlation stage correlates the received signal symbols with their delayed versions and averages this function over a set number of correlations produced from that number of received symbols from within a sliding window. As shown, a received signal symbol $r_n$ is delayed in the delay element 101 and its complex conjugate is taken by element 102. The resulting signal is provided to the element 103, which calculates the inner product between the received symbol and the delayed conjugate of the received signal. Both the received symbol and the delayed, conjugate symbol are represented by complex values. Element 104 takes the imaginary part of the resulting inner product to produce the self-correlation value of the received signal:

$$A_n = Im(r_n \cdot r_{n-1})^{FB} \sim P_n \cos \theta.$$

The notation FB means the equation holds if and only if the signals are in the frequency correction burst defined in GSM 05.02 and discussed above.

The averaged correlation values are normalized and compared to a first predefined threshold. When the averaged and normalized correlation values (i.e., the first revenue function) exceed the first predefined threshold for N contiguous symbols, the preliminary decision is made that the synchronization tone has been detected with sufficient certainty. The second self-correlation stage preferably uses a second revenue function that is independent of the phase offset normally introduced by the propagation channel and the receiver to reduce the false alarm probability and avoid the performance degradation caused by large frequency deviations.

Figure 3:
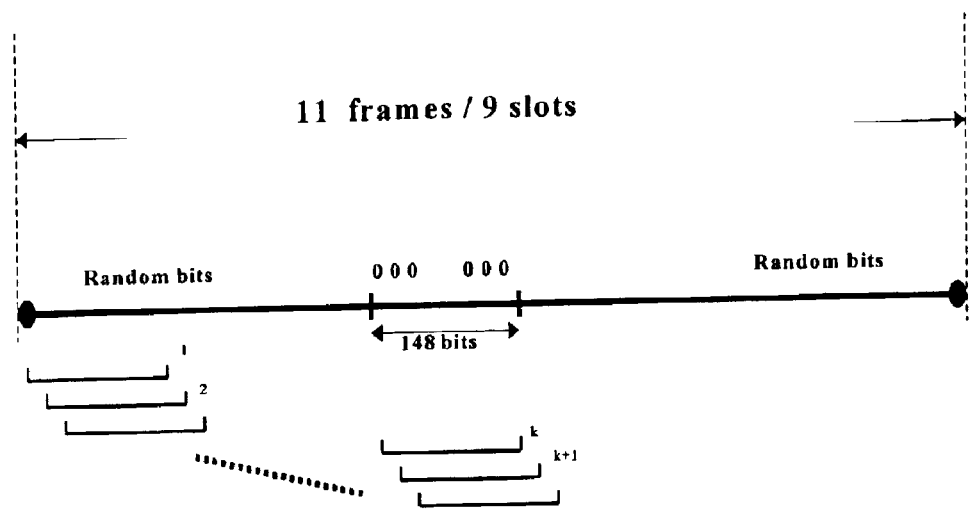
FIG. 3 shows the sliding window moving average of the delayed correlation.

Averaged over the correlation window for noise filtering (element 105 in FIG. 1), the first stage revenue function at time k can be written as $$S_1(k) = \frac{\sum_{window\_size} A_n}{\sum_{window\_size} P_n}$$

where $A_k$ is the imaginary part of the correlation of received signal symbols with their delayed versions as shown in FIG. 1. The sliding window size can be chosen, for example, as 146 symbols and to have k ranges over the receiving window defined by the GSM standard for different modes of operation (11 frames for idle mode and 9 slots for idle frame search). In schematic overview, the moving average of the self-correlation process in the first stage can proceed as depicted in FIG. 3.

Referring again to FIG. 1, the illustrated system preferably calculates an average power function to normalize the revenue function. The received signal symbols are provided to element 112, which calculates their magnitude and the resulting data are provided to a moving average element 111 that calculates an average power using the same number of symbols as are used in the self-correlation average. In other words, the two sliding windows are of the same size. Using the sliding average like this maintains the revenue function within a desired range. The summation over the window of the transmitted power gives a measure of mean power and provides normalization for the real part of the received signal symbols. Generally this revenue function is calculated in a digital signal processor (DSP), as are other aspects of the synchronization process.

To prevent long divisions that would likely be undesirable in a preferred DSP implementation of this strategy, the following comparison (element 106 in FIG. 1) preferably is performed instead, $$\sum_{window\_size} A_n \overset{?}{>} \sum_{window\_size} P_n \cdot \lambda_1$$

for N contiguous symbols,
where the sliding window size can be chosen as W symbols and k ranges over the receiving window. In the comparison illustrated in the equation, $\lambda_1$ is the first predefined threshold for the first stage process, and preferably is empirically determined and smaller than unity. The moving average self-correlation process of stage 1 can proceed as is depicted in FIG. 3.

The first self-correlation unit preferably makes a preliminary determination that the synchronization signal is detected if the revenue function $S_1$ is larger than the first predefined threshold for N contiguous symbols. After this preliminary detection, the second stage self-correlation process is activated. The second stage process may, in this preferred implementation, calculate the outer product of adjacent signals at time n, which takes the following form (element 110 in FIG. 1):

$$B_n = -Re(r_n \cdot r_{n-1})^{FB} \sim P_n \sin \theta.$$

Preferably the synchronization process enters the second stage while the calculation of the first correlation stage is still going so that the second stage self-correlation process proceeds at least partially in parallel with the first stage. For ease of illustration, the following complex quantity is defined:

$$Z_k = \sum_{window\_size} A_n + j \sum_{window\_size} B_n \overset{FB}{\sim} Pe^{j\theta}.$$

The second stage revenue function is obtained from the correlation of two neighboring $Z_k$ and preferably eliminates the large phase offset normally introduced by the radio propagation channel. The second revenue function preferably is normalized by an estimate of the mean power determined from the first stage correlation process. Thus, the second stage revenue function is obtained from the correlation of two neighboring $Z_k$ to eliminate the phase offset and is normalized by the mean power from the first stage correlation process. The second stage revenue function may be given by:

$$S_2(k) = \frac{Re\{Z_k \cdot Z^*_{k-1}\}}{\left(\sum_{window\_size} P_n\right)^2}.$$

Making use of the second stage revenue function is a preferred process that eliminates the effect of frequency deviations and hence the strategy preferably can detect a GMSK modulated tone even when the local oscillator has a large frequency error with respect to the base station (e.g., VCXO is used). The computation in the second stage takes the results of the first stage including mean power and averaged cosine components, that is, the high computation loads of the second stage process preferably are shared with the first stage process to some degree. Alternatively, the sine, cosine, and power components can be pre-calculated in a calculation phase performed before detection to avoid peak DSP computation loading.

When implementing these synchronization strategies, the same technique can be applied to the second stage correlation process as was used for the threshold comparison in the first stage process. Preferably, the second stage threshold comparison is performed in element 107 so as to avoid divisions in the preferred digital signal processor implementation. That is, $$Re\{Z_k \cdot Z_{k-1}^*\} \stackrel{?}{>} \left(\sum_{window\_size} P_n\right)^2 \cdot \lambda_2$$

for contiguous M symbols.

If the above statement is true, the FCCH is successfully detected. If the revenue function of the second stage is greater than the predefined threshold for M contiguous symbols, the frequency synchronization signal is successfully detected. Otherwise, such as when the second stage revenue function falls below the second threshold before the determined limit of contiguous symbols, the state machine for detection goes back to the first stage correlation process. The detection is considered complete when the sliding window scans over the whole receiving window. Finally, after the FCCH is detected, the residual frequency estimator (RFE) (108 in FIG. 1) is enabled and generates a value that preferably is used to compensate for the frequency offset between the local oscillator and base station clock.

Figure 4:
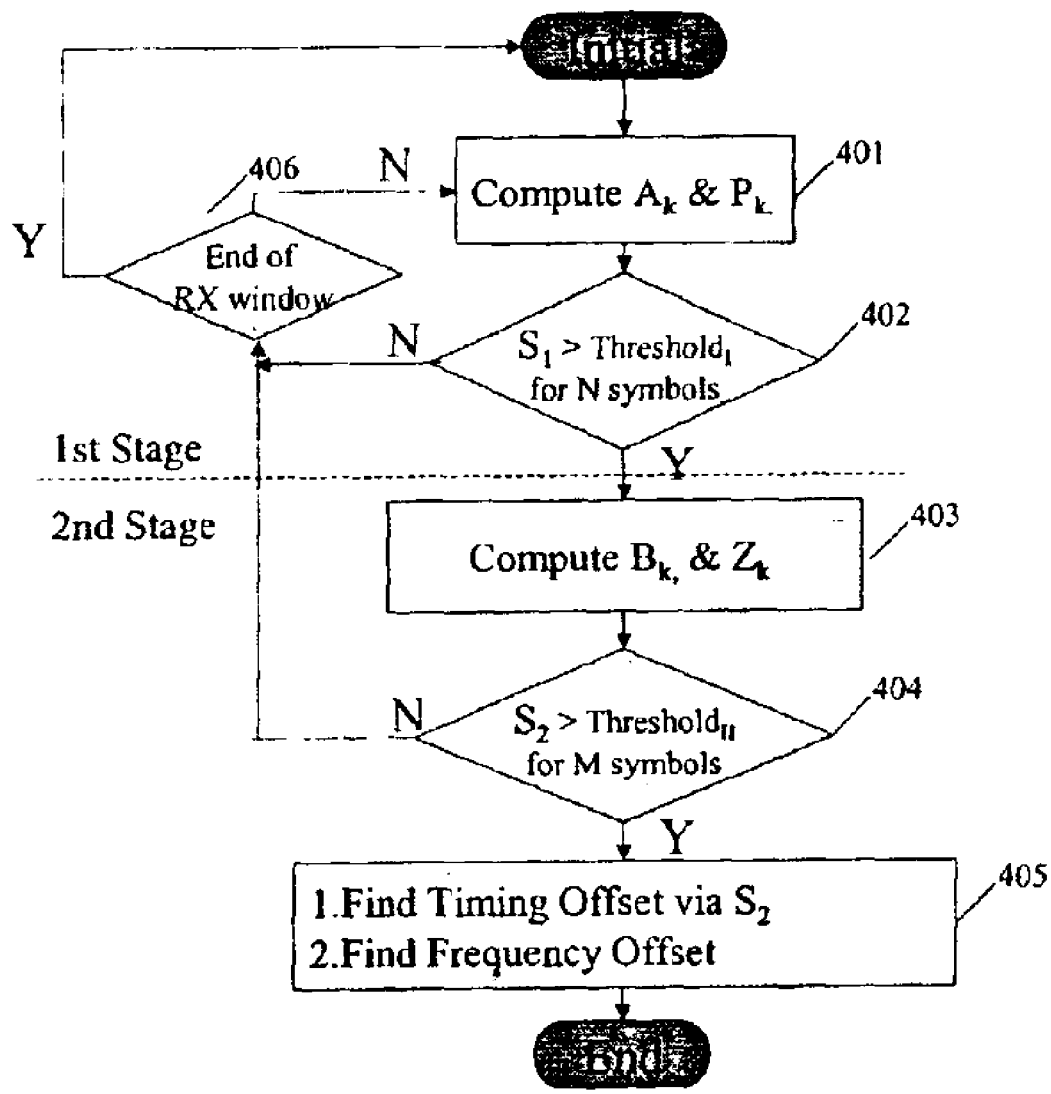
FIG. 4 shows a processing flow chart that might be used for a firmware/software implementation of the first synchronization strategy.

The overall processing procedures can be explained further with the help of the flow chart provided in FIG. 4. When the synchronization procedure is called, the synchronization process starts computing $A_k$ and $P_k$, and then obtains their averaged values through a moving average method in the first self-correlation unit. Each pair of moving averages of $A_k$ and $P_k$, $$\sum_{window\_size} A_n \text{ and } \sum_{window\_size} P_n,$$

is tested to see whether the first ratio of these two averaged values exceeds the first predefined threshold for N contiguous received signal symbols. If the first test becomes true, the second self-correlation unit computes $B_k$ and $Z_k$. The second ratio is computed and compared to the second predefined threshold to see whether the second ratio exceeds the second predefined threshold for M contiguous received signal symbols. If the second test becomes true, the correlation is stopped and the detection of the synchronization tone (FCCH) is declared. Additionally, the timing boundary of the incoming data stream in a digital transmission system is found by detecting when the pilot tone occurs. Otherwise, if the receiving window does not end, the synchronization process starts again and repeats the same procedures as stated above. If the receiving window ends, the synchronization procedure is stopped until it is called in the next receiving window.

Figure 5:
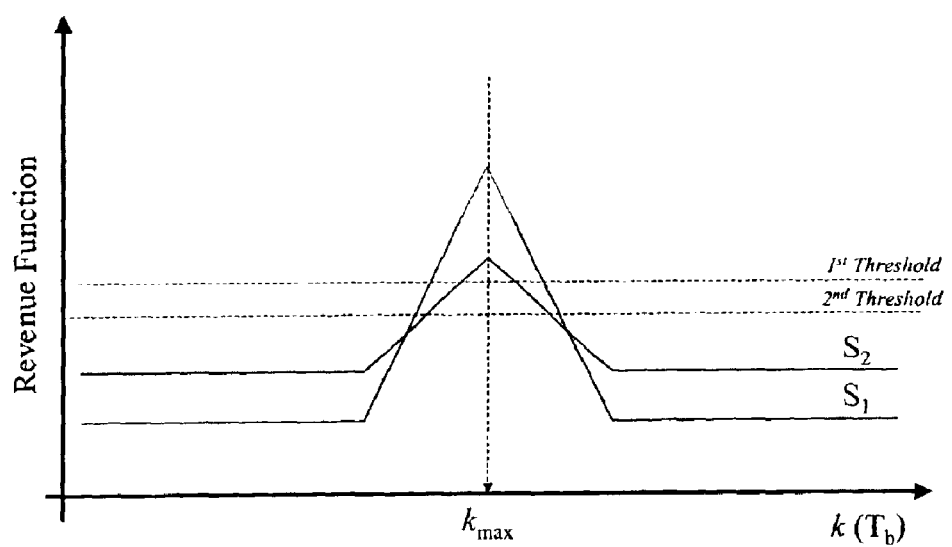
FIG. 5 shows a typical diagram of the revenue function associated with timing estimation according to the first synchronization strategy.

The timing boundary of the incoming data stream in a digital transmission system can be estimated by the positioning unit seeking for the peak of the cost function of the second stage of the synchronization process as shown in FIG. 5. Further, as long as the existence of FCCH is known to the receiver, the receiver can use the frequency estimator to estimate the frequency offset of the received signal symbols.

Figure 6:
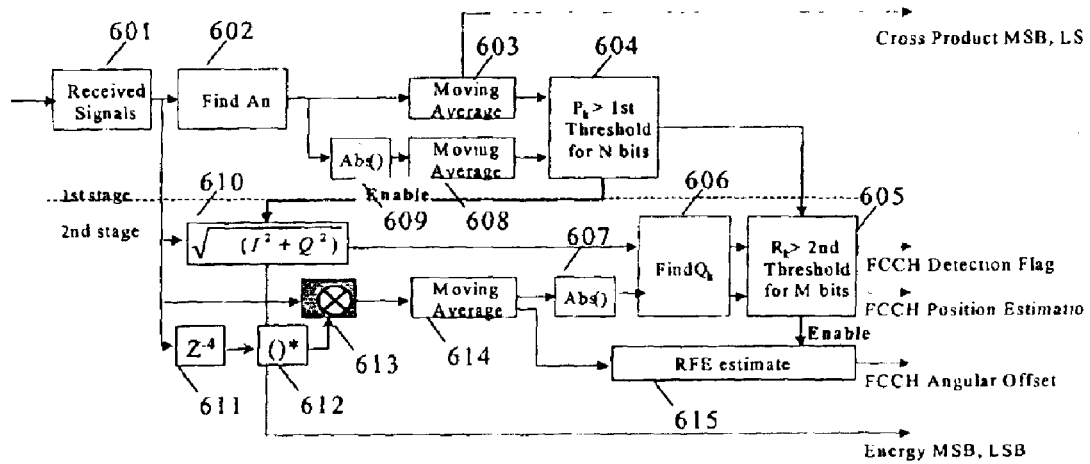
FIG. 6 is a functional block diagram of a synchronization process in accordance with a second synchronization strategy.

FIG. 6 shows an alternative synchronization strategy where the first stage revenue function can be obtained as follows:

$$A_n = -(r_I(n) + r_Q(n+1)) \times (r_I(n+2) + r_Q(n+3)), \text{ n=even number}$$

$$A_n = -(r_I(n) - r_Q(n-1)) \times (r_I(n+2) - r_Q(n+1)), \text{ n=odd number}$$

where r(n) is the complex valued, received signal symbol at time n. The subscripts I and Q indicate the real part and imaginary part respectively. Signals are received, sampled and processed in element 601 and the sequence of received signal symbols are provided to the element 602 that calculates the functions listed above. The received signal symbols are also provided to appropriate other parts of the receiver, as illustrated in FIG. 6. The output of calculation element 602 is provided to both a moving average element 603 and a sequence of an absolute value element 609 followed by another moving average element 608. The moving averages are calculated over sliding windows and most preferably over the same sliding windows. The outputs of the moving average elements are provided to the calculation element 604. The first stage detection revenue function of the alternative strategy is calculated by element 604 as $$P_k = \frac{\sum_{Window\_size} A_n}{\sum_{Window\_size} |A_n|}.$$

The cross product $A_n$ can be computed (element 602) every two symbols to reduce the computation loads without losing information. This result has been verified through simulations and has the readily apparent advantage of reduced calculational complexity and faster tone acquisition. As a result, the effective number of multiplications is one per symbol. Because the symbols are arrayed about the GMSK constellation, the denominator of the $P_k$ function provides an estimate related to the average power of the received signals.

The calculation of $P_k$ in element 604 is preferably performed by making a comparison between the outputs of the two moving average elements 603, 608 in the manner discussed above to avoid the use of divisions, which are generally a computationally slow process. Of course, the division operation can be performed in practicing this strategy; it will simply be slower and often speed is important. When the calculation element 604 observes that the first stage revenue function $P_k$ exceeds the threshold value for N contiguous symbols, the calculation element 604 makes a preliminary determination that the frequency synchronization burst or tone is detected. On making that determination, the first stage correlation unit and specifically the calculation element 604 signals the determination by providing an enable signal to the second stage correlation unit. As with the receiver illustrated in FIG. 1, the receiver of FIG. 6 uses the second correlation unit to confirm the presence of the frequency synchronization burst.

In the second stage self-correlation process, the value $Q_k$ is obtained by finding the correlation value of the complex portions of the received signals. Since the mean power can be estimated by the time average of the absolute value of r(n), the correlation of the complex signals is found by the ratio of the conjugate product of the adjacent signals to the power estimate. The process of calculating the correlation can be written as $$\frac{Q_{UP}}{Q_{DN}} = \frac{\left|\sum_{\text{Window\_size}} (r(n) \times r^*(n-D))\right|}{\sum_{\text{Window\_size}} |r(n)|^2}, D \in int \cup D \neq 0.$$

As shown in FIG. 6, the second correlation stage self-correlates the received signal symbols with their delayed versions and averages this function over a set number of correlations produced from the number of received symbols from within a sliding window. The signal symbols are delayed in the delay element 611 and their complex conjugates are taken by element 612. The resulting signal is provided to the element 613, which calculates the inner product between the received symbols and the delayed conjugate of the received signal. Element 614 performs a moving average on the resulting sequence of self-correlation values and provides that output to element 607, which takes the absolute value and provides the absolute value to the calculation element 606. Separately, element 610 calculates the time average of the square of the absolute value of the received signal values, which produces a power estimate, as discussed above. The average power value and the average self correlation value are provided to calculation unit 606, which performs portions of the revenue function calculation for the second correlation stage. The revenue function calculation is completed in element 605. Preferably the calculation in element 605 is performed by making a comparison between the outputs of the numerator and denominator of the revenue function illustrated above. Again, this avoids the use of divisions, which are generally a computationally slow process.

Using the second stage and its revenue function is a particularly preferred process, which merges the revenue function of the first stage with the Q function and gets rid of the dependency of the phase offset. If the new revenue function is larger than a new threshold, $Threshold_{11}$, for another period of M contiguous symbols, the FCCH is declared as finally detected. Notice that when the detection is declared for the second stage, the same condition must be also valid for the criterion of the first stage, i.e., $$R_k = 0.5(P_k + Q_k)? > Threshold_{11}, k \in \{k: P_k > Threshold_1\}$$

We may rewrite the above equation as follows for implementation purposes:

$$(P_{UP} \cdot Q_{DN} + Q_{UP} \cdot P_{DN})? > (P_{DN} \cdot Q_{DN})(2 \cdot Threshold_{11}).$$

Figure 7:
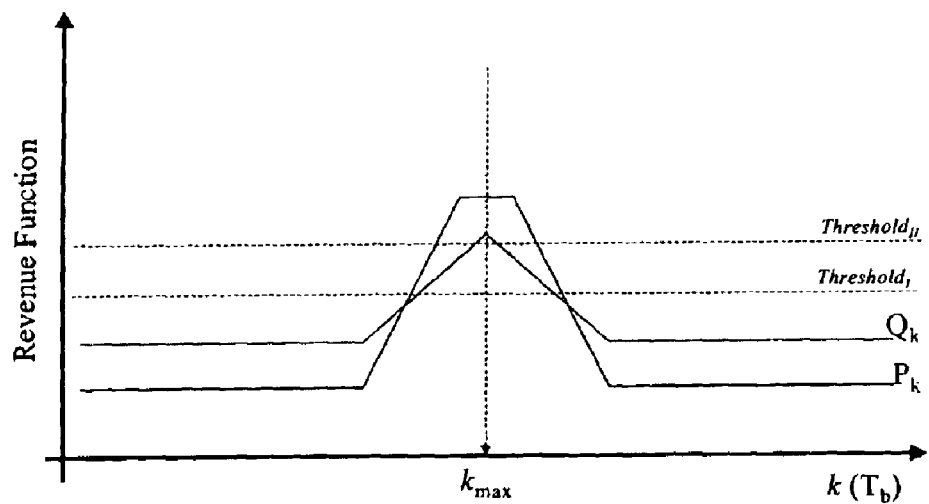
FIG. 7 shows a typical diagram of the revenue function associated with timing estimation according to the second synchronization strategy.

The timing boundary of the data stream can be estimated by the positioning unit within element 605 seeking for the peak of the cost function of the second stage of the synchronization process as shown in FIG. 7. Finally, after the FCCH is detected, the residual frequency estimator (RFE) (615 in FIG. 6) is enabled to compensate for the frequency offset between the local oscillator and base station clock. As long as FCCH is known to the receiver, the receiver can use the frequency estimator to estimate the angular frequency offset of the received signal symbols.

When the second stage revenue function $R_k$ falls below $Threshold_{11}$, the second stage detection cycle is complete and the state machine goes back to the first stage detection. The detection process is considered totally complete when the sliding window runs over all twelve frames (FIG. 3). As the detection process finishes, the system goes back and checks if there is only one detection declared for the second stage process. The whole process will be considered as a "false alarm" if more than one detection is identified in the second stage process. In the case of more than one second stage detection or in the case of no detection, the detection process will be restarted and may search other carriers for FCCHs. If only one detection in the second stage happens, the FCCH detection is considered correct by the system and the timing offset, $k_{max}$, is estimated (element 615) as follows:

$$k_{max} = \arg\max\{R_k\}.$$

The phase shift value is estimated by $$D\_angle = \frac{1}{D} \times \arctan\{Q_{UP}^I, \text{sign}(Q_{UP}^R)(|Q_{UP}^R| - \lambda|Q_{UP}^I|)\} \text{ (Rad)},$$

$$D \in int \cup D \neq 0$$

which represents the frequency offset value of $$f_cOff = \frac{270,833}{2D\pi} \times \arctan\{Q_{UP}^I, \text{sign}(Q_{UP}^R)(|Q_{UP}^R| - \lambda|Q_{UP}^I|)\}(\text{Hz}),$$

$$D \in int \cup D \neq 0$$

Figure 8:
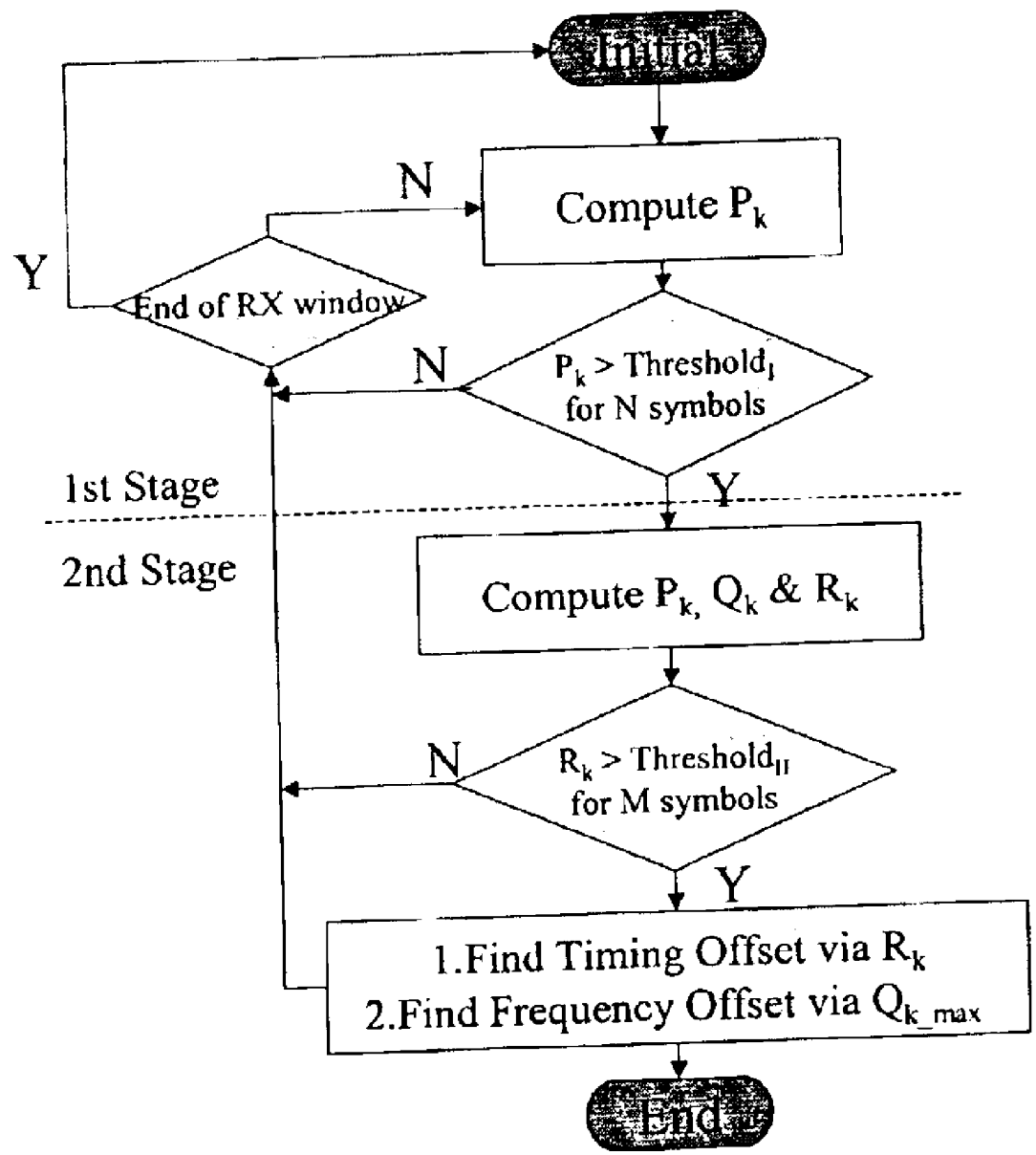
FIG. 8 shows the processing flow chart that might be used for a firmware/software implementation of the second synchronization strategy.

The relation between revenue functions of the first and the second stages, as well as the timing offset decision are shown in FIG. 7. Moreover, the flow chart is very similar to that of the first synchronization strategy and is shown in FIG. 8.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

What is claimed is:

1. A method of detecting a frequency synchronization signal from a plurality of received signal symbols in a digital transmission network, the method comprising:
   correlating the received signal symbols including a frequency correction tone;
   averaging the correlated received signal symbols using a moving average over a sliding window to generate at least a portion of a revenue function;
   calculating an average power of the received signal symbols for normalizing the revenue function;
   determining whether the frequency correction tone is detected by comparing the revenue function with a threshold by checking a sign bit of a difference of the revenue function and a product of the threshold and the average power, and observing that the revenue function exceeds the threshold for a number of contiguous symbols; and
   after the frequency correction tone is detected, estimating a timing offset by searching for a peak position of the revenue function;
   whereby the frequency synchronization signal is detected according to the frequency correction tone and the timing offset.

2. The method of claim 1, wherein the method proceeds through a first stage, preliminary detection process to preliminarily detect the frequency correction tone and through a second stage, confirming detection process to confirm detection of the frequency correction tone.

3. The method of claim 2, wherein the first stage receives a first set of complex valued signal symbols and forms a cross product from the first set of complex valued signal symbols.

4. The method of claim 3, wherein the first stage calculates a sequence of the cross products and performs moving averaging on the sequence of the cross products.

5. The method of claim 4, wherein the first stage performs averaging responsive to the sequence of the cross products to generate at least a portion of the first revenue function.

6. The method of claim 5, wherein the first stage makes the preliminary detection decision on the basis of factors including the first revenue function and an average power measure.

7. The method of claim 5, wherein the first stage make the preliminary detection decision by comparing the first revenue function with a threshold constant times an average power measure and observing that the first revenue function exceeds the threshold constant times the average power measure for a plurality of contiguous symbols.

8. The method of claim 4, wherein the cross products are calculated every other symbol.

9. The method of claim 2, wherein the second stage self-correlates received signal symbols with delayed versions of the received signal symbols to produce a sequence of self-correlation values and averages this sequence to form a second revenue function.

10. The method of claim 9, wherein the second stage makes a comparison based on the second revenue function and on an average power of the received signal symbols to confirm detection of the frequency correction tone.

11. The method of claim 2, wherein the first stage receives a first set of signal symbols and delays the first set of signal symbols and forms a second set of signal symbols delayed with respect to the first set of signal symbols, the first stage combining the first set and the second set of signal symbols in determining a first revenue function.

12. The method of claim 11, wherein the first stage correlates the first set and the second set of signal symbols to provide first correlated values.

13. The method of claim 12, wherein the second stage performs different correlation of the first correlated values to obtain second correlated values.

14. The method of claim 13, wherein the second stage generates a second revenue function responsive to the second correlated values.

15. The method of claim 14, wherein the second stage performs an averaging function on values responsive to the first correlated values to generate a second revenue function.

16. The method of claim 15, wherein the second stage makes a comparison based on the second revenue function and on the average power to confirm detection of the frequency correction tone.

17. The method of claim 12, wherein the first stage performs averaging responsive to a real part of the first correlated values to generate the first revenue function.

18. The method of claim 17, wherein the first stage makes the preliminary detection decision on the basis of factors including the first revenue function, the average power and a number of contiguous symbols.

19. The method of claim 17, wherein the first stage make the preliminary detection decision by comparing the first revenue function with a threshold constant times the average power and observing that the first revenue function exceeds the threshold constant times the average power for a plurality of contiguous symbols.

20. A method of detecting a frequency synchronization signal from a plurality of received signal symbols in a digital transmission network, the method comprising:

providing a preliminary detection decision of the received signal symbols by a first stage process, wherein the first stage process includes:
calculating a first revenue function of the received signal symbols; and
comparing the first revenue function of the received signal symbols with a first threshold;
if the preliminary detection decision indicates that the frequency synchronization signal is detected, providing a final detection decision of the received signal symbols by a second stage process, wherein the second stage process includes:
calculating a second revenue function of the received signal symbols; and
comparing the second revenue function of the received signal symbols with a second threshold; and
if the final detection decision confirms that the frequency synchronization signal is detected, estimating a timing offset of the frequency synchronization signal by searching for a peak position of the second revenue function.

21. The method of claim 20, wherein in the first stage process, the calculating further comprises:
generating a cross-product of each two received signal symbols in a predefined manner to obtain a value An;
obtaining an absolute value of the value An; and
separately moving-averaging the value An and its absolute value over a sliding window.

22. The method of claim 21, wherein in the second stage process, the calculating further comprises:
receiving a plurality of symbols from the first stage process;
correlating the symbols from the first stage process with its self-delayed version to obtain a plurality of complex values, wherein each complex value has a real part and an imaginary part;
moving-averaging each complex value; and
obtaining an absolute value of the moving averaged complex value;
wherein the second revenue function is calculated according to the absolute value of the moving averaged complex value, and moving-averaged value An and its absolute value.

23. The method of claim 20, wherein in the comparing of the first stage process, the preliminary detection decision indicates that the frequency synchronization signal is detected if the first revenue function of the received signal symbols exceeds the first threshold for a predefined number of continuous symbols.

24. The method of claim 20, wherein in the comparing of the second stage process, the finial detection decision confirms that the frequency synchronization signal is detected if the second revenue function of the received signal symbols exceeds the second threshold for a predefined number of continuous symbols.

25. The method of claim 20, wherein in the first stage process, the calculating further comprises:
correlating the received signal symbols with its self-delayed version to obtain a plurality of complex values, wherein each complex value has a real part and an imaginary part.

26. The method of claim 25, wherein the calculating of the first stage process further comprises moving-averaging each imaginary part of the complex values over a sliding window and the calculating of the second stage process further comprises moving-averaging each real part of the complex values over a sliding window, and
    wherein the second revenue function in the second stage process is calculated according to the moving-averaged real part and the moving-averaged imaginary part of the complex values.

27. The method of claim 25, wherein the calculating of the first stage process further comprises moving-averaging each real part of the complex values over a sliding window and the calculating of the second stage process further comprises moving-averaging each imaginary part of the complex values over a sliding window, and
    wherein the second revenue function in the second stage process is calculated according to the moving-averaged real part and the moving-averaged imaginary part of the complex values.

28. An apparatus of detecting a frequency synchronization signal from a plurality of received signal symbols in a digital transmission network, comprising:
    a preliminary detection decision unit for providing a preliminary detection decision of the received signal symbols by a first stage process, wherein the first stage process includes:
        calculating a first revenue function of the received signal symbols; and
        comparing the first revenue function of the received signal symbols with a first threshold; and
    a final detection decision unit for providing a final detection decision of the received signal symbols by a second stage process if the preliminary detection decision indicates that the frequency synchronization signal is detected, wherein the second stage process includes:
        calculating a second revenue function of the received signal symbols; and
        comparing the second revenue function of the received signal symbols with a second threshold; and
    an estimation unit for estimating a timing offset of the frequency synchronization signal by searching for a peak position of the second revenue function if the finial detection decision confirms that the frequency synchronization signal is detected.

29. A method of detecting a synchronization tone in a frequency synchronization signal in a digital transmission network, the method comprising:
    performing a first stage process for delivering a preliminary detection decision of the synchronization tone;
    performing a second stage process for confirming the preliminary detection decision; and
    wherein in the first stage process, a first revenue function is used for delivering the preliminary detection decision and a second revenue function is used for confirming the preliminary detection decision, wherein the first revenue function and the second revenue function are different,
    if the preliminary detection decision is confirmed, performing a timing offset estimation to find the timing of the synchronization tone.

30. The method of claim 29, wherein the first stage process comprises:
    correlating the received signal symbols, wherein the correlated received signal symbols have a real part and an imaginary part;
    averaging the real part of the correlated received signal symbols using a moving average over a sliding window to generate the first revenue function;
    calculating an average power of the received signal symbols for normalizing the first revenue function; and
    comparing the first revenue function with a first threshold,
    wherein the preliminary detection decision of the synchronization tone is made by observing whether the first revenue function exceeds the first threshold for a number of contiguous received signal symbols.

31. The method of claim 30, wherein the second stage process comprises:
    averaging the imaginary part of the correlated received signal symbols and forming a complex value;
    correlating the complex value with the previous one to generate the second revenue function; and
    comparing the second revenue function with a second threshold,
    wherein the preliminary detection decision of the synchronization tone is confirmed by observing whether the second revenue function exceeds the second threshold for a number of contiguous received signal symbols.

32. The method of claim 29, wherein the timing offset is estimated by searching for a peak position of the second revenue function.

* * * * *